(12) United States Patent
Kekki

(10) Patent No.: US 8,285,404 B1
(45) Date of Patent: Oct. 9, 2012

(54) SLIGHTLY VARYING SHUFFLING OF CONTENT ITEMS IN PLAYLISTS

(75) Inventor: Samuli T. Kekki, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 986 days.

(21) Appl. No.: 12/258,778

(22) Filed: Oct. 27, 2008

(51) Int. Cl.
*G06F 17/00* (2006.01)
(52) U.S. Cl. ............ 700/94; 707/E17.005; 707/E17.009
(58) Field of Classification Search ...................... 700/94
See application file for complete search history.

(56) References Cited

U.S. PATENT DOCUMENTS

| 6,526,411 | B1 | 2/2003 | Ward |
| 7,801,900 | B2 * | 9/2010 | Noma ............................ 707/748 |
| 2003/0163823 | A1 * | 8/2003 | Logan et al. .................... 725/89 |
| 2005/0039206 | A1 | 2/2005 | Opdycke |
| 2006/0195790 | A1 * | 8/2006 | Beaupre et al. ................ 715/727 |
| 2006/0265421 | A1 * | 11/2006 | Ranasinghe et al. ........ 707/104.1 |
| 2008/0091717 | A1 * | 4/2008 | Garbow et al. ............ 707/104.1 |
| 2008/0104122 | A1 | 5/2008 | Hempleman |

OTHER PUBLICATIONS

Oliver et al., Physiology and Purpose-Aware Automatic Playlist Generation, Microsoft Research, One Microsoft Way, Redmond, WA 98052.
Vossen, M.P.H., Master's Thesis—Local Search for Automatic Playlist Generation, Jun. 2005, Department of Mathematics and Computing Science, Eindhoven University of Technology, The Netherlands.

* cited by examiner

*Primary Examiner* — Paul McCord
(74) *Attorney, Agent, or Firm* — Kilpatrick Townsend & Stockton LLP

(57) ABSTRACT

A media player provides a shuffle controller that slightly varies a play order of a playlist. The media player receives a playlist the defines a first play order of content items. The first play order is indicated by respective positions of content items identified in the playlist. The media player swaps respective positions of at least two content items identified in the playlist to define a second play order for the content items. In one configuration the media player determines a swap condition that may or may not result in the swapping of two adjacently identified content items in the play list. After iterating over the playlist, the media player provides the playlist defining the second play order of content items. This shuffled playlist can be played back or saved.

21 Claims, 4 Drawing Sheets

SLIGHTLY VARYING SHUFFLING OF CONTENT ITEMS IN PLAYLISTS

RELATED APPLICATION

None.

BACKGROUND

Many conventional media player software applications and media player devices (e.g. MP3 players, Cell phones, Personal Digital Assistants, etc.) provide a user with an ability to play media content such as audio files, videos or other multimedia data from playlists created by the user. A playlist may be an arrangement or sequence of individual media content items arranged in an order specified by the user, or a playlist may simply be a library of media contained in storage or memory accessible to the device or software. The user operates media player software on a computer or embedded within the media player itself to create playlists by selecting specific content items (e.g. songs) from a library of available content and placing those content items into the playlist in an order desired and specified by the user. Once created, the media player software or media player device typically provides the ability for the user to save a playlist for future access. After creation of a playlist, the user can operate the software or media player device to begin play back of the content items listed in the playlist in the order specified by the playlist. A playlist thus allow a user to create a list of favorite audio tracks or other content items in an order desired by that user and the user can save the playlist to allow playback of the items in the play list in the order specified by the user (i.e. as indicated by the order of the content items in the playlist).

After a user operating a conventional media player device or playback software has listened to a playlist of content items several times, he or she may become accustomed to the order of the songs or other content items specified in the playlist. As an example, if the user creates a playlist of ten songs from various artists and listens to that playlist several times, the user may become quite used to the sequence of those songs in the order specified by the play list and the user will be able to predict the next song that follows a song presently being played back. To avoid this predictability and to enhance the enjoyment of the user experience when listening or viewing content played back from a playlist, many conventional media player devices and media player software applications provide the ability to randomly shuffle the order or sequence of content items in a playlist. When a user selects a shuffle or random feature to be applied to a playlist of content items, the media player device or media player software engages in a process of randomly rearranging content items for playback from the playlist. As an example, for a playlist of ten songs, the shuffle feature of a conventional media player device or media player software will randomly rearrange the order of the songs in the playlist and begin playback of those songs in accordance with the newly chosen random order. In dong so, a conventional shuffle operation provides the user with a random presentation or playback of content items in an order not originally specified by the playlist to avoid the predictability and user boredom that results from listening to or viewing the same content items in the same order as arranged in the original playlist.

SUMMARY

Conventional media player devices and/or media player software applications that provide a shuffle operation suffer from a variety of deficiencies. In particular, when a user is creating a playlist from a library of media, the order of content items added form the library to the playlist typically has some meaning to the user. For example, when a user creates a playlist from the library, the library categorizes or lists the content items such as songs by artist. As a result, as the user browses through the library of content items and adds item after item to the playlist, it is quite common for songs of one artist to be grouped together in the playlist. Once the user has added songs from one artist to the playlist and continues down the listing of songs available in the library, as groups of songs in the library are encountered by that user, the user may decide to add a select number of songs from the next artist, then the next artist, and so on. The result is a playlist in which groups of songs from each artist appear in sequence in the playlist. In other cases, a user may simply select songs for addition in to a playlist from different artist that he or she likes in a particular order as determined by the user. In both cases however, the user has determined the order of songs in a playlist based on some criteria of interest to that user. Even when a playlist is simply the library of content items available for use to a user, the playlist (as a library) is typically arrange in some order, such as by artist, author, etc.

When a conventional media player (as used herein, the term "media player" is meant to include either a software application operating on a computer system or a dedicated media player device and is not intended to be limiting of either) invokes a shuffle operation on a playlist, the shuffle operation randomly reorders sequence of content items to be played from the playlist. As a result, a conventional shuffle operation completely destroys any order imposed on the sequence of songs in the playlist as originally created by the user who built the playlist (or who created his or her library of music if the library itself is considered the playlist). As an example, for a short user created playlist the includes a sequence of ten songs in which the first four, second four, and last two are from respective different artists, a conventional random shuffle operation may completely and randomly intermix songs from all three artists with no regard to their original placement in the playlist. While this certainly provides a different playlist playback order than the original sequence, any meaning given by the user to the original play order of songs in the original playlist is completely lost as a result of application of the conventional random shuffle operation.

Embodiments disclosed herein provide a system, method and apparatus that operates within a media player to provide a "controlled shuffle" that operates to slightly vary an order of songs, videos, multimedia or other content items in a playlist without providing a complete random shuffle of such content items. By only slightly varying the play order of a playlist, the processing does not completely destroy any user meaning or playlist organization that may be present in the original order of songs or other content items in the playlist. As an example, using the operations disclosed herein, the controlled shuffle operation applied to an original playlist may mix play order of content items nearby each other in the original playlist play order while not typically swapping identities of content items at opposite ends or located more distantly from each other in the original playlist play order. As an example, the controlled shuffle can mix or rearrange a play order of adjacent songs with each other in a music playlist. By applying a unique shuffle operation to controlled regions of the playlist such as, in one example, only conditionally swapping placement of adjacent content items in the playlist play order, the system disclosed herein provides a user with a unique playback experience that maintains some semblance of the original order (e.g. songs nearby each other in the original order may be only slightly mixed by the controlled shuffle) while still providing a playback sequence or second play order that is different than the original playlist sequence.

More particularly, embodiments disclosed herein provide a media player with a shuffle controller that receives a playlist the defines a first play order of content items. The content items may be any type of media that can be played back, listened to, rendered, watched, or otherwise perceived by a user. The first play order is indicated by respective positions of content items identified in the playlist. The shuffle controller swaps respective positions of at least two content items identified in the playlist to define a second play order for the content items and provides (e.g. for playback) the playlist defining the second play order of content items. The swap is conditional and may or may not take place, depending upon a swap condition. Thus in some cases, the identities of two content items may be switched in position from the first play order of the playlist, whereas for another pair of content items, their positions in the playlist may not be swapped and their play order will remain the same as the first play order.

In one configuration, identifying pairs of content items in the play list comprises iterating over the content items in the playlist to identify adjacent pairs of content items. By conditionally swapping positions (i.e. identities) of adjacent content items, the order of the playlist is changed from its original order, but since items nearby each other (e.g. adjacent in this example) are considered when determining if there positions in the first play order are to be swapped or not, the shuffle controller only slightly varies the play order and does not drastically disorganize the nature of the original or first play order when producing the second play order.

In one embodiment, swapping respective positions of at least two content items identified in the playlist comprises identifying pairs of content items in the play list. In one embodiment, identifying pairs of content items in the play list comprises iterating over the content items in the playlist to identify adjacent pairs of content items. For each identified pair of content items, the media player operating the shuffle controller calculates a swap condition and determines if the swap condition indicates that respective positions of each content item in the identified pair in the playlist are to be exchanged. If the swap condition indicates that respective positions of each content item in the identified pair in the playlist are to be exchanged, the media player operating the controlled shuffle process exchanges the respective positions of each content item in the identified pair in the playlist.

In other embodiments, identifying adjacent pairs of content items in the playlist begins with a first pair of content items in the playlist and proceeds to identify successive pairs of content items in the playlist until an end of the playlist is reached. In this manner, the shuffle controller processing is able to traverse down a playlist and applies the conditional swap operation to adjacent pairs of content items from start to end in the original play order. In another configuration, a media player employing the shuffle controller identifies adjacent pairs of content items in the playlist beginning with a last pair of content items in the playlist at an end of the playlist and proceeds to identify successive pairs of content items in the playlist until a start of the playlist is reached, and for each pair applied to conditional swap operation to determine if the two content items are to be swapped in position.

In another embodiment, identifying successive pairs of content items comprises identifying successive pairs of adjacent content items wherein each identified pair of content items shares an identity of at least one content item. As an example, by having successive pairs of content items that each share an identity of one content item to be considered for swapping, if there are three content items A, B, C in sequence in the first play order, it is possible for the position of the content item A to be swapped with the B (assuming the conditional swapping decision applied to the first pair A and B indicates the positions are to be swapped) so after the first swap the play order is B, A, C. Using this new play order, the second pair (A, C) is then considered for swapping and if the swap decision indicates the second pair (A, C) are to be swapped, the final play order will be B, C, A.

In another embodiment, identifying successive pairs of content items in the playlist until an end of the playlist is reached comprises identifying successive pairs of adjacent content items wherein each identified pair of content items does not share an identity of at least one content item. In this case, if there are three content items A, B, C in a first play order, it is possible for the position of the content item A to be swapped with the B (assuming the conditional swapping decision applied to the first pair A and B indicates the positions are to be swapped). Since there is no other pair of content items in the playlist (that is, content item C does not have another content item it can be paired with for determination of the swap condition), the final play order is B, A, C.

In one embodiment, calculating or determining a swap condition comprises generating a random number and identifying if a value of the random number is within a predetermined threshold. If the value of the random number is within a predetermined threshold the media player produces a swap condition that indicates that respective positions of each content item in the identified pair in the playlist are to be exchanged.

In another embodiment, the media player receives a shuffle metric (e.g. from a user or from a preset value stored in memory). The shuffle metric indicates an amount of desired shuffling of content items that is to occur in the playlist. The media player correlates the predetermined threshold to a value of the shuffle metric. A shuffle metric having a value indicating a higher amount of desired shuffling of content items in the playlist results in production of a swap condition causing respective positions of each content item in the identified pair in the playlist to be exchanged more often than a shuffle metric having a value indicating a lower amount of desired shuffling. In this manner, the outcome of conditional swap decisions for different pairs of content items in the playlist can be adjusted to favor more or less shuffling as may or may not be desired by the user.

In addition to the embodiments as discussed above, other embodiments the media player configured as a stand along device, such as an MP3 player, video player, cell phone with or other device equipped with circuitry and/or software that provides a media player to reproduce digitally stored content. Other embodiments include a general purpose computer system such as a workstation, server, handheld or laptop computer, or the like to carry out and/or support any or all of the method operations disclosed herein. In other words, one or more computerized devices or processors can be programmed and/or configured to include a media player as explained herein to carry out different embodiments of the invention.

Yet other embodiments herein include software programs to perform the steps and operations summarized above and disclosed in detail below. The media player can be a stand alone software application and process, or may be a web-based application or even a web service. One such embodiment comprises a computer program product that has a computer-readable medium (e.g., a tangible computer readable media, disparately located or commonly located media)

including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the media player techniques explained herein.

Also, it is to be understood that each of the systems, methods, and apparatuses herein can be embodied strictly as a software program, as a hybrid of software and hardware, or as hardware alone such as within a processor, or within an operating system or within a software application, or via a non-software application. Example embodiments of the invention may be implemented in products and/or software applications such as those manufactured by Adobe Systems Incorporated of San Jose, Calif., USA.

As discussed above, techniques herein are well suited for use in software applications supporting media playback and shuffling of content items within mobile electronic devices or on computer systems. It should be noted, however, that embodiments herein are not limited to use in such applications and that the techniques discussed herein are well suited for other media player systems such as those used to playback content for presentation over the Internet, on full-size computer displays, on television, or for playback of music or video shown ion television, or over a radio network.

Additionally, although each of the different features, techniques, configurations, etc. herein may be discussed in different places of this disclosure, it is intended that each of the concepts can be executed independently of each other or in combination with each other. Accordingly, the media player employing shuffle operations explained herein can be embodied in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
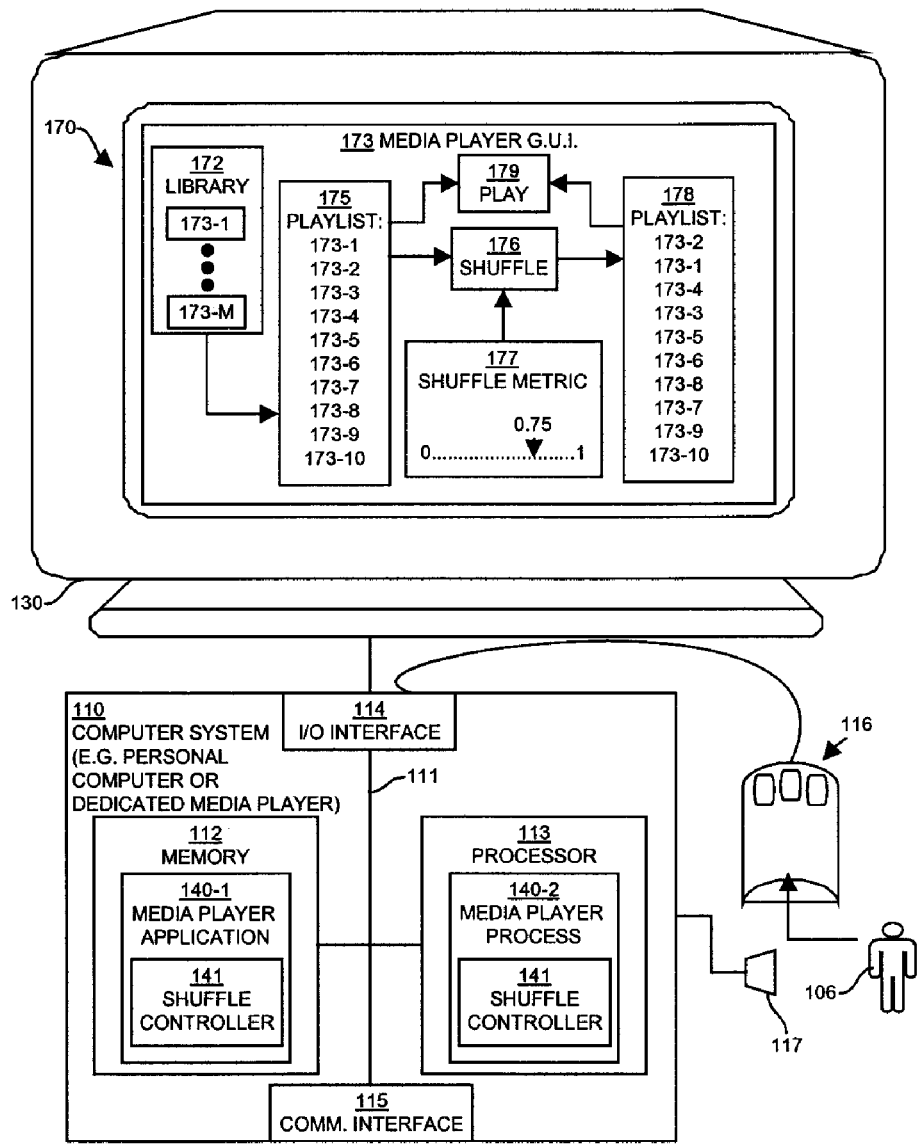
FIG. 1 is an example diagram of a media player operating in a computer system according to embodiments disclosed herein.

FIG. 1 is a block diagram illustrating an example architecture of computer system 110 that executes, runs, interprets, operates or otherwise performs a media player application 140-1 and media player process 140-2 (referred to herein collectively as media player 140) as disclosed herein. The media player 140 incorporates a shuffle controller 141 that operates processing as described herein to shuffle content items 173 to slightly vary (but not completely randomly) the order of the content items in a playlist 175 to create a resultant second play order as shown in playlist 178. By only mixing or varying the order of content items somewhat or slightly, without completely reordering a playlist randomly, the mixing or shuffling operations disclosed herein do not completely destroy any user meaning or library organization (e.g. artist grouping) that may be present in the original order of songs or other content items in the playlist 175.

The computer system 110 may be any type of computerized device such as a personal computer, workstation, portable computing device, console, laptop, network terminal, or portable media player or similar dedicated device such as an MP3 player, cell phone, PDA, or the like. The computer system 110 includes an interconnection mechanism 111 such as a data bus or other circuitry that couples a memory system 112, a processor 113, an input/output interface 114, and a communications interface 115. An input device 116 (e.g., one or more user controlled devices such as buttons, keypad, touch screen, mouse, stylus, etc.) couples to processor 113 through I/O interface 114, and enables a user 106 to provide input commands and generally control the media player application 140-1 and process 140-2 via graphical interaction on a display 130. The computer system further includes audio speakers 117 to allow audio played by the media player 140 to be listened to by the user 106. The media player 140 can also show or render video content (not shown) on the display 130 during playback of content items 173. The communications interface 115 enables the computer system 110 to communicate with other devices (i.e., other computers, laptops, cellular phones, PDA's, servers, etc.) on a network (not shown).

The memory system 112 is any type of computer readable medium and in this example is encoded with the media player application 140-1 that includes the shuffle controller 150. The media player application 140-1 and shuffle controller may be embodied as software code such as data and/or logic instructions (e.g., executable code stored in the memory or on another computer readable medium such as a removable disk or in firmware) that supports processing functionality according to different embodiments described herein. During operation of the computer system 110, the processor 113 accesses the memory system 112 via the interconnect mechanism 111 in order to launch, run, execute, interpret or otherwise perform the logic instructions of the media player application 140-1. Execution of the media player application 140-1 in this manner produces processing functionality of the media player process 140-2. In other words, the media player process 140-2 represents one or more runtime instances of the media player application 140-1 performing or executing within or upon the processor 113 in the computerized device 110 at runtime. During execution, the media player 140 renders a graphical user interface 170.

The example graphical user interface 170 includes a content item library 172 containing various content items 173-1 through 173-M (where M is the total number of content items in the entire library), a playlist 175 having a first play order of content items 173-1 through 173-10. In this example, the first play order is the actual sequence or arrangement of ordered content item identities 173-1 through 173-10 in the playlist 175. The graphical user interface 170 also contains a shuffle button 176 that invokes operation of a shuffle controller 150. The graphical user interface further includes a shuffle metric 177 and second or resultant playlist 178 that indicates a second play order for the content items 173 from the playlist 175 after application of the shuffle processing as explained herein. Assume for this example discussion that the content item library 172 contains content items 173 that are audio tracks (i.e. songs) from various musical artists.

The graphical user interface 170 allows the user 106 to create a playlist 175. In this example the playlist 175 is an ordered sequence of ten audio tracks 173-1 through 173-10. The user 106 creates the playlist 175 by selecting (e.g. dragging and dropping) content items 173 from a content item library 172 and placing each content item into the playlist 175. While not shown, the media player 140 allows a playlist 175 to be saved for future access by the user and any time that user 106 launches the media player 140 they can listen to the playlist. Note that a playlist is created by the user by way of example only, and that the term playlist as used herein does not have to require user creation, but rather can be any list of content items obtained from anywhere. Thus a playlist may be machine generated or may be a list of content items available from an online library of content, from a compilation (e.g. order of tracks from a compact disc) on or from any other source. For purposes of this disclosure then, a playlist is any ordered sequence of content items. Also note the playlist does not have to actually contain the content items themselves but rather needs to identify the content items in a play order. The actual content or digital data of content items, such as music data, video data, etc. of each content item may be maintained in storage and the playlist can be a list of identities of content items in a given play order.

To listen to the playlist 175 in its original or first play order (i.e. the sequence of audio tracks 173-1 through 173-10), the user selects the play button 179 and the media player 140 begins to play the content items 173-1 through 173-10 in the play order that they appear in the playlist 175 (e.g. plays audio tracks in the sequence 173-1 through 173-10). After listening to the playlist 175 numerous times in this manner, the user 106 may become used to the predictability of the play order or sequence of content items 173-1 through 173-10 in the playlist 175. To overcome this and provide a varied user experience, the media player 140 allows the user to select the shuffle button 176. This triggers the processing as disclosed herein to shuffle the order of content items and the playback (i.e. the play button 179) now gets its next track from the playlist 178. That is, the media player 140 operates the shuffler controller 150 to shuffle the order of the content items 173-1 through 173-10 from playlist 175 to produce playlist 178 as disclosed herein. Note the shuffling is performed in a manner that does not completely randomly mix up the first play order of the sequence of content items 173-1 through 173-10. In contrast to a conventional random shuffle operation that randomly mixes up the first play order, the shuffle controller 150 as explained herein mixes the play order of nearby content items to create a mix of the first play order that is not a radical change to its original order. As an example, in one configuration, the shuffle controller 150 iterates over adjacent pairs of content items in the playlist 175 and determines if a swap condition indicates that two adjacent content items (e.g. 173-1 and 173-2) should swap position in the playlist.

In one configuration, the user 107 is able to adjust the shuffle metric 177 that correlates to how often the swap condition will occur causing swapping positions of nearby (e.g. adjacent in one example) content items 173 in the first play order of the playlist 175. A higher shuffle metric 177 causes content item positions to be swapped more frequently, whereas a lower shuffle setting causes the swap condition to occur less frequently and thus swapping of content item positions does not occur as often and the play order remains "less shuffled". In FIG. 1, the second or resultant playlist 178 represents an example of a second play order as it would appear after application of the processing of the shuffle controller 176. Note in the illustrated example, the order of certain adjacent pairs of content items 173 from the first playlist 175 have been swapped in the second playlist 178. Further features and operations of the media player 140 will now be described using flow charts of processing steps that show example operations of the shuffle controller 176 as disclosed herein.

Figure 2:
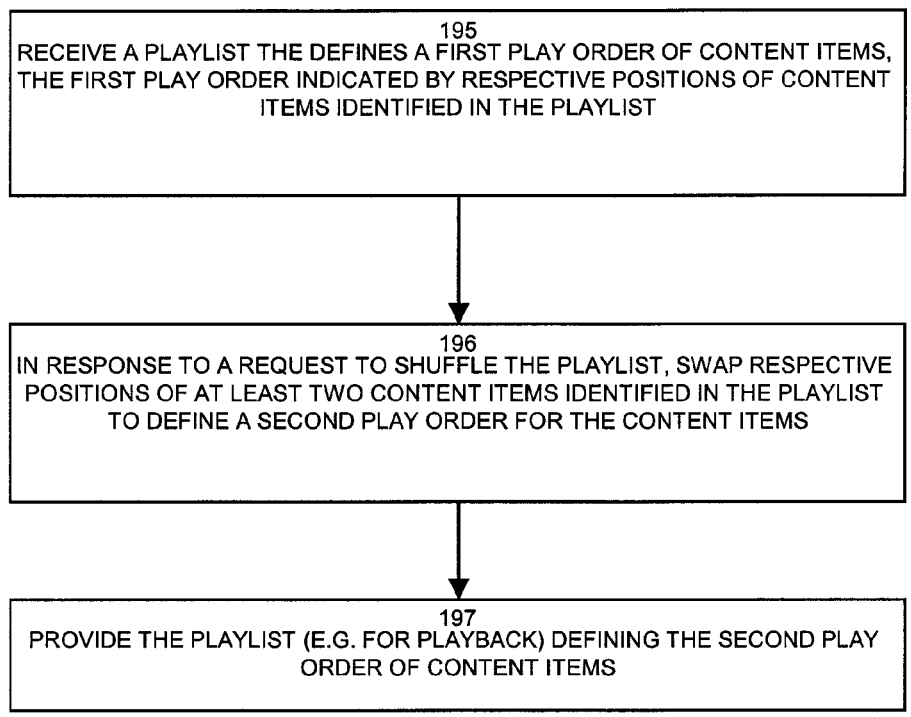
FIG. 2 is a flow chart of high level processing that a media player performs to shuffle content items in accordance with example embodiments disclosed herein.

FIG. 2 is a flow chart of processing showing the high level operation of the media player 140 in accordance with example embodiments.

In step 195, the media player 140 receives a playlist 175 the defines a first play order of content items (e.g. 173-1 through 173-10). The play order is indicated by respective positions of content items identified in the playlist 175.

In step 196, in response to a request to shuffle the playlist (e.g. the user pressing a shuffle button 176), the media player 140 swaps respective positions of at least two content items identified in the playlist to define a second play order (i.e. the order of content items 173 in the second playlist 178 in FIG. 1). In example configurations as will be explained, the shuffle controller 176 in the media player 140 is able to traverse or iterate over the playlist 175 and is able to select successive pairs of content items and use a swap condition (e.g. a random number that may or may not meet a threshold value set by the swap metric) to determine if the two content items 173 in the pair are to exchange or swap positions with each other in the playlist 175. As an example, the media player 140 identifies adjacent pairs of content items in the playlist beginning with a first pair of content items at a start of the playlist and proceeds to identify successive pairs of content items in the playlist until an end of the playlist is reached. In another example, the media player identifies adjacent pairs of content items in the playlist beginning with a last pair of content items in the playlist at an end of the playlist and proceeding to identify successive pairs of content items in the playlist until a start of the playlist is reached. During this processing (either from beginning to end of playlist, or from end to beginning, or both), for each adjacent pair of content items identified in the playlist, the media player 140 calculates a swap condition for that adjacent pair. If the swap condition indicates that respective positions of each content item 173 in the adjacent pair in the playlist are to be exchanged, the media player 140 exchanges the respective positions of each content item in the adjacent pair in the playlist.

In step 197, the media player 140 provides the playlist 178 defining the second play order of content items. The playlist can be provided as output for playback to the user 106 or to save as a new playlist. In this manner, content item positions are not randomly swapped with each other from random locations around the playlist 175, but rather, content items nearby each other (adjacent in one example) may or may not be swapped. The result is a playlist shuffle operation that does not radically alter the original order of the playlist, but still results in some rearranging of the playlist order. Note that the processing described herein can be performed before playback occurs, or during playback of content items within the playlist. If performed during playback, when a current content item is being played, the next pair of content items in the playlist (e.g. a pair that follows the current content item being played back) is processed according to the shuffle operations disclosed herein (i.e. a swap condition is determined) to determine if the positions of those next two content items are to be swapped with each other.

Figure 3:
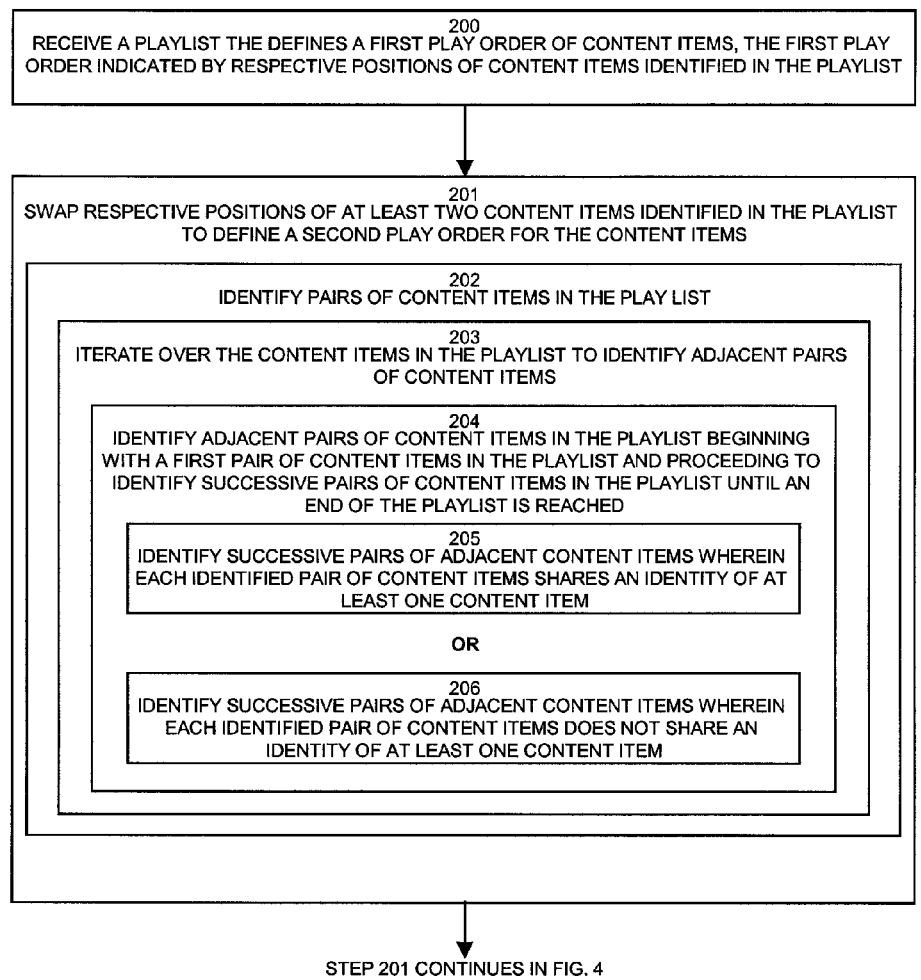
FIGS. 3 and 4 are a single flowchart illustrating example methods in detail that a media player provides to shuffle content items in a playlist according to embodiments herein.
Figure 4:
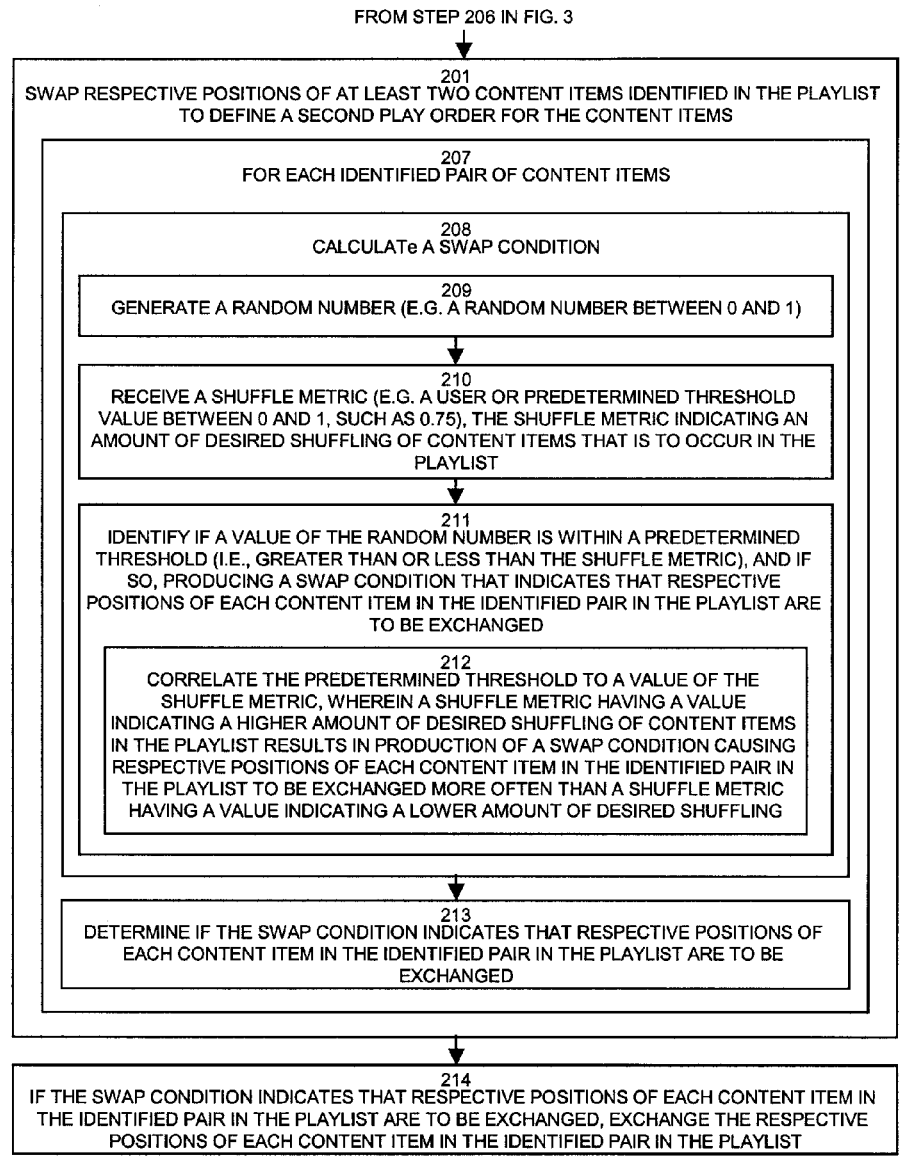

FIGS. 3 and 4 are a flowchart of processing steps that the media player 140 performs to shuffle contents of a playlist from a first play order (as shown in the first playlist 175) to a second play order as shown in second playlist 178. The processing in flow charts 3 through 5 shows details of the high level processing explained above.

In step 200, the media player 140 receives a playlist 175 that defines a first play order of content items 173. As discussed above, the playlist 175 can be any order list of content items 173 and may be user created or may be created by software. The play order is indicated by respective positions 173-1 through 173-10 of content items 173 identified in the playlist 175.

In step 201, in response to a request to shuffle the playlist (e.g. the user pressing a shuffle button 176), the media player 140 swaps respective positions of at least two content items 173-1 through 173-10 identified in the playlist 175 to define a second play order (e.g. as shown in play list 178) for the content items 173. Details of this processing are shown in steps 202 through 207.

In step 202, in response to the user pressing the shuffle button 176, the media player 140 identifies pairs of content items in the play list. Step 203 provides an example of selection of pairs of content items.

In step 203, the media player 140 iterates over the content items 173 in the playlist to identify adjacent pairs of content items.

In step 204, the media player 140 identifies adjacent pairs of content items in the playlist beginning with a first pair of content items in the playlist and proceeds to identify successive pairs of content items in the playlist until an end of the playlist is reached. In an alternative embodiment, in step 204, the media player 140 identifies adjacent pairs of content items in the playlist beginning with a last pair of content items in the playlist at an end of the playlist and proceeds to identify successive pairs of content items in the playlist until a start of the playlist is reached.

Sub-steps 205 and 206 show two example alternative ways of identifying pairs of content items from the playlist to which a determination will be applied if those content items should be swapped or not.

In step 205, the media player 140 identifies successive pairs of adjacent content items wherein each identified pair of content items shares an identify of at least one content item. Using the example playlist 175 in FIG. 1, when different identified adjacent pairs of content items share an identity of at least one content item, the media player will use the pairings in the following sequence: (173-1, 173-2), (173-2, 173-3), (173-3, 173-4), (173-4, 173-5), (173-5, 173-6), (173-6, 173-7), and so forth. In this manner, it may be possible, depending on how many swap conditions in a row indicate that positions of content items are to be swapped with each other, that a single content 173 item may move down the list (assuming the selection of content item pairs begins at the start) further that just to an adjacent position.

In alternative step 206, the media player 140 identifies successive pairs of adjacent content items wherein each identified pair of content items does not share an identity of at least one content item. Using the example playlist 175 in FIG. 1, when different identified adjacent pairs of content items do not share an identity of at least one content item, the media player will use the pairings in the following sequence: (173-1, 173-2), (173-3, 173-4), (173-5, 173-6), (173-7, 173-8), (173-9, 173-10). In this manner, since no content item is used in more than one pairs of content items during swap condition processing (as will be explained shortly), the placement of content items in the second play order (i.e. in the resultant playlist 178) can only be one position away from where that content item originally was placed. This results in minimal shuffling of the playlist since a given content item can only move one position away in the resultant list.

In step 207 the media player enters a processing loop shown by steps 208 through 214 that is performed for each identified pair of content items.

In step 208 the media player 140 calculates a swap condition. Sub steps 209 through 212 show calculation of a swap condition for each predetermined pair in accordance with one example embodiment.

In step 209 the media player 140 generates a random number. As an example, the random number may be a value that the media player 140 generates between 0 and 1.0. The random number will be used in calculation of the swap condition.

In step 210 the media player 140 receives a shuffle metric 177. Once received, the shuffle metric 177 in this example is thus a predetermined threshold value set by the user and indicates an amount of desired shuffling of content items that is to occur in the playlist 175. In other embodiments, the shuffle metric may be preset and not user adjustable. If the random number generated in step 209 is between 0 and 1.0, the shuffle metric may be a value within the same range. Suppose for this example the shuffle metric has a value 0.75. Note that receipt of the shuffle metric need only be done once and is not required to be set differently for each selected adjacent pair of content item.

In step 211 the media player 140 identifies if a value of the random number is within (e.g. great than or less than) the predetermined threshold, and if so, produces a swap condition that indicates that respective positions of each content item in the current identified pair in the playlist are to be exchanged. Sub-step 212 indicates how the shuffle metric correlates to the predetermined threshold. As an example, if the shuffle metric 177 is established by a user to be 0.75, then that can be the predetermined threshold that is compares with a random number between 0 and 1. If the random number is greater than the shuffle metric 177, then a swap condition is said to exist that causes the positions of content items in a pair to be swapped within the playlist 175.

In step 212 the media player 140 correlates the predetermined threshold to a value of the shuffle metric. In a simple example, suppose the shuffle metric is a user set value between 0 and 1, such as 0.75. This shuffle metric value is the predetermined threshold that the random number (that is randomly generated between 0 and 1) must exceed (e.g. be great than in this example) for a swap condition to exist. If the random number is selected between 0 and 1, and the shuffle metric is 0.75, then if the random number is below 0.75 no shuffling occurs for the two content items of a pair. That is, 25% of the time the random number (i.e. when it is above 0.75) will exceed the shuffle metric and a swap condition is said to exist that causes the positions of the two content items in the current selected content item pair (e.g. adjacent content items in the playlist) to be swapped with each on in position in the playlist. If the shuffle metric were set at 0.5, there is a 50-50 chance that the content items of a selected pair would be swapped (this assumes that the random number ranges from 0 to 0.5 50% of the time and 0.5 to 1 the other 50% of the time statistically). Thus, a shuffle metric that sets a predetermined threshold having a value indicating a higher amount of desired shuffling of content items in the playlist results in production of a swap condition causing respective positions of each content item in the identified pair in the playlist to be exchanged more often than a shuffle metric that sets a predetermined threshold having a value indicating a lower amount of desired shuffling.

In step 213, the media player 140 determines if the swap condition indicates that respective positions of each content item in the identified pair in the playlist are to be exchanged. If the swap condition indicates that respective positions of each content item in the identified pair in the playlist are to be exchanged, processing proceeds to step 214. If the swap condition indicates that respective positions of each content item in the identified pair in the playlist are not to be exchanged, and there are more pairs of content items in the playlist that have not been processed, processing proceeds back to step 207 for the next pair of content items in the playlist 175. If no pairs of content items remain, processing proceeds to step 215.

In step 214, if the swap condition indicates that respective positions of each content item 137 in the identified pair in the playlist 175 are to be exchanged, the media player 140 exchanges the respective positions of each content item in the identified pair in the playlist 175 resulting in production of a new second play order, as shown in the playlist 178 in FIG. 1 in which certain pairs of content items from the playlist 175 have been swapped. In other words, in accordance with processing described above, the shuffle the media player performs the conditional swap operation by identifying the shuffle metric established by a user of the media player. The shuffle metric has a shuffle metric value that exists within a predetermined range, such as some value between 0 and 1 (as shown in the slider setting to be 0.75 in FIG. 1). For each pair of content items in the list, the media player generates a random number having a value that also falls within the predetermined range (e.g. the random number is also between 0 and 1). To produce the swap condition, the media player compares the random number to the a shuffle metric established by the user. If the random number is within a first side of the predetermined range in comparison to the shuffle metric (e.g. above 0.75), the media player produces a swap condition that indicates content items identified in the adjacent pair of content items are to be swapped in position within the play order of the playlist. If the random number is within a second side of the predetermined range in comparison to the shuffle metric (e.g. below 0.75), the media player produces a swap condition that indicates content items identified in the adjacent pair of content items are not to be swapped in position within the play order of the playlist. In this example then, there is a 25% chance of swapping play order positions of content items for each identified pair processed in this manner.

In step 215, the media player provides the playlist 178 defining the second play order of content items.

The following is an example of pseudo code that illustrates an another embodiment of an algorithm that the media player 140 can perform to conditionally swap or shuffle content items in a playlist as explained herein.

300: Threshold=Shuffle_Metric_from_User (value between 0 and 1 e.g., 0.75)
301: Array Playlist[Playlist_Length];
302: For (I=0; I<Playlist_Length−1; I++)
{
303: R=get_random_number_between_zero_and_one;
304: if (R>Threshold) then switch (playlist[I], playlist[I+1]);
}

In the example code above, line 300 causes the media play to set the predetermined threshold to a value of the shuffle metric as set by the user 106, or the metric may be preset. At line 301, the media player 140 declares (i.e. obtains) the playlist that contains the identity of a content items 173. Playlist_Length is the number of content items in the playlist. At line 302 the media player 140 creates a loop that occurs for as many iterations as the playlist length. Within the loop, at line 303 the media player 140 obtains a random number R between 0 and 1. Then, at line 304, if the media player determines that the value of R is less than the value of the Threshold (that can be set by the user from the shuffle metric), the media player 140 performs a switch operations that exchanges the positions of content items within the playlist. Note in this example that the content item pairs that are swapped or switched are adjacent content items pairs and share an identity of a content item at each iteration of the loop.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method comprising
using one or more processors to perform the steps of:
receiving a playlist that defines a first play order of content items, the first play order indicated by respective positions of content items identified in the playlist;
in response to a request to shuffle the playlist, performing a controlled swap of at least two content items identified in the playlist by:
iterating over adjacent pairs of content items;
responsive to said iterating, for each pair of content items, calculating a swap condition based on a threshold and determining whether to swap at least one pair of content items based on the swap condition; and
responsive to determining to swap the at least one pair of content items, swapping respective positions of the at least one pair of content items;
providing the playlist defining the second play order of content items.

2. The method of claim 1 wherein identifying pairs of content items in the play list comprises:
iterating over the content items in the playlist to identify adjacent pairs of content items.

3. The method of claim 2 wherein iterating over the content items in the playlist to identify adjacent pairs of content items comprises:
identifying adjacent pairs of content items in the playlist beginning with a first pair of content items in the playlist and proceeding to identify successive pairs of content items in the playlist until an end of the playlist is reached.

4. The method of claim 3 wherein proceeding to identify successive pairs of content items in the playlist until an end of the playlist is reached comprises:
identifying successive pairs of adjacent content items wherein each identified pair of content items shares an identity of at least one content item.

5. The method of claim 3 wherein proceeding to identify successive pairs of content items in the playlist until an end of the playlist is reached comprises:

identifying successive pairs of adjacent content items wherein each identified pair of content items does not share an identity of at least one content item.

6. The method of claim 1 wherein calculating the swap condition comprises:

generating a random number; and wherein determining if the swap condition indicates that respective positions of each content item in the identified pair in the playlist are to be exchanged comprises:

identifying if a value of the random number is within a predetermined threshold, and if so, producing a swap condition that indicates that respective positions of each content item in the identified pair in the playlist are to be exchanged.

7. The method of claim 6 comprising:

receiving a shuffle metric, the shuffle metric indicating an amount of desired shuffling of content items that is to occur in the playlist;

correlating the predetermined threshold to a value of the shuffle metric, wherein a shuffle metric having a value indicating a higher amount of desired shuffling of content items in the playlist results in production of a swap condition causing respective positions of each content item in the identified pair in the playlist to be exchanged more often than a shuffle metric having a value indicating a lower amount of desired shuffling.

8. The method of claim 1 wherein swapping respective positions of at least two content items identified in the playlist to define a second play order for the content items comprises:

identifying adjacent pairs of content items in the playlist beginning with a first pair of content items at a start of the playlist and proceeding to identify successive pairs of content items in the playlist until an end of the playlist is reached;

for each adjacent pair of content items identified in the playlist, calculating a swap condition for that adjacent pair and if the swap condition indicates that respective positions of each content item in the adjacent pair in the playlist are to be exchanged, exchanging the respective positions of each content item in the adjacent pair in the playlist; and wherein providing the playlist defining the second play order of content items comprises:

playing content items in the playlist in accordance with a sequence defined by the second play order.

9. The method of claim 1 wherein swapping respective positions of at least two content items identified in the playlist to define a second play order for the content items comprises:

identifying adjacent pairs of content items in the playlist beginning with a last pair of content items in the playlist at an end of the playlist and proceeding to identify successive pairs of content items in the playlist until a start of the playlist is reached;

for each adjacent pair of content items identified in the playlist, calculating a swap condition for that adjacent pair and if the swap condition indicates that respective positions of each content item in the adjacent pair in the playlist are to be exchanged, exchanging the respective positions of each content item in the adjacent pair in the playlist; and wherein providing the playlist defining the second play order of content items comprises:

playing content items in the playlist in accordance with a sequence defined by the second play order.

10. A non-transitory computer readable medium having instructions encoded thereon that, when executed on a computerized device, cause the computerized device to perform operations comprising:

receiving a playlist that defines a first play order of content items, the play order indicated by respective positions of content items identified in the playlist;

in response to a request to shuffle the playlist, performing a controlled swap of at least two content items identified in the playlist by:

iterating over adjacent pairs of content items;

responsive to said iterating, for each pair of content items, calculating a swap condition based on a threshold and determining whether to swap at least one pair of content items based on the swap condition; and responsive to determining to swap the at least one pair of content items, swapping respective positions of the at least one pair of content items;

providing the playlist defining the second play order of content items.

11. The computer readable medium as in claim 10 wherein instructions that cause the computerized device to perform the operations of identifying pairs of content items in the play list include instructions that cause the computerized device to perform operations comprising:

iterating over the content items in the playlist to identify adjacent pairs of content items.

12. The computer readable medium as in claim 11 wherein iterating over the content items in the playlist to identify adjacent pairs of content items comprises:

identifying adjacent pairs of content items in the playlist beginning with a first pair of content items in the playlist and proceeding to identify successive pairs of content items in the playlist until an end of the playlist is reached.

13. The computer readable medium as in claim 12 wherein instructions that cause the computerized device to perform operations of proceeding to identify successive pairs of content items in the playlist until an end of the playlist is reached include instructions that cause the computerized device to perform operations comprising:

identifying successive pairs of adjacent content items wherein each identified pair of content items shares an identity of at least one content item.

14. The computer readable medium as in claim 12 wherein instructions that cause the computerized device to perform operations of proceeding to identify successive pairs of content items in the playlist until an end of the playlist is reached include instructions that cause the computerized device to perform operations comprising:

identifying successive pairs of adjacent content items wherein each identified pair of content items does not share an identity of at least one content item.

15. The computer readable medium as in claim 10 wherein instructions that cause the computerized device to perform operations comprising calculating a swap condition include instructions that cause the computerized device to perform operations comprising:

generating a random number; and wherein determining if the swap condition indicates that respective positions of each content item in the identified pair in the playlist are to be exchanged comprises:

identifying if a value of the random number is within a predetermined threshold, and if so, producing a swap condition that indicates that respective positions of each content item in the identified pair in the playlist are to be exchanged.

16. The computer readable medium as in claim 15 including instructions that cause the computerized device to perforin operations comprising:
- receiving a shuffle metric, the shuffle metric indicating an amount of desired shuffling of content items that is to occur in the playlist;
- correlating the predetermined threshold to a value of the shuffle metric, wherein a shuffle metric having a value indicating a higher amount of desired shuffling of content items in the playlist results in production of a swap condition causing respective positions of each content item in the identified pair in the playlist to be exchanged more often than a shuffle metric having a value indicating a lower amount of desired shuffling.

17. The computer readable medium as in claim 10 wherein instructions that cause the computerized device to perform operations comprising swapping respective positions of at least two content items identified in the playlist to define a second play order for the content items include instructions that cause the computerized device to perform operations comprising:
- identifying adjacent pairs of content items in the playlist beginning with a first pair of content items at a start of the playlist and proceeding to identify successive pairs of content items in the playlist until an end of the playlist is reached;
- for each adjacent pair of content items identified in the playlist, calculating a swap condition for that adjacent pair and if the swap condition indicates that respective positions of each content item in the adjacent pair in the playlist are to be exchanged, exchanging the respective positions of each content item in the adjacent pair in the playlist.

18. The computer readable medium as in claim 10 wherein instructions that cause the computerized device to perform operations comprising swapping respective positions of at least two content items identified in the playlist to define a second play order for the content items include instructions that cause the computerized device to perform operations comprising:
- identifying adjacent pairs of content items in the playlist beginning with a last pair of content items in the playlist at an end of the playlist and proceeding to identify successive pairs of content items in the playlist until a start of the playlist is reached;
- for each adjacent pair of content items identified in the playlist, calculating a swap condition for that adjacent pair and if the swap condition indicates that respective positions of each content item in the adjacent pair in the playlist are to be exchanged, exchanging the respective positions of each content item in the adjacent pair in the playlist.

19. A computer system comprising:
a memory;
a processor;
a display;
wherein the memory is encoded with a media player application that when executed in the processor provides a media player process that performs the operations of:
- receiving a playlist that defines a first play order of content items, the play order indicated by respective positions of content items identified in the playlist;
- in response to a request to shuffle the playlist, performing a controlled swap of at least two content items identified in the playlist by:
  - iterating over adjacent pairs of content items;
  - responsive to said iterating, for each pair of content items, calculating a swap condition based on a threshold and determining whether to swap at least one pair of content items based on the swap condition; and
  - responsive to determining to swap the at least one pair of content items, swapping respective positions of the at least one pair of content items;
- providing the playlist defining the second play order of content items.

20. A media player stored in a non-transitory computer-readable medium and configured to be executed by a processor, wherein the media player is configured to:
- perform a shuffle operation on a playlist that defines a first play order of content items, the shuffle operation iterating over the content list and identifying successive adjacent pairs of content items; and
- for each identified successive adjacent pair of content items, perform a conditional swap operation that swaps respective positions of the content items in the successive adjacent pair based on a calculated swap condition, the calculated swap condition based on a threshold, and if the calculated swap condition is met, the shuffle operation configured to result at least one successive adjacent pair of content items being swapped in position in the first play order to define a second play order for content items in the playlist; and
- play content items in the playlist in accordance with the second play order of content items.

21. The media player of claim 20 wherein the media player is further configured to perform the conditional swap operation including the following steps:
- identify a shuffle metric established by a user of the media player, the shuffle metric having a shuffle metric value that exists within a predetermined range;
- generate a random number have a value within the predetermined range;
- compare the random number to the a shuffle metric established by the user and if the random number is within a first side of the predetermined range in comparison to the shuffle metric, producing a swap condition that indicates content items identified in the adjacent pair of content items are to be swapped in position within the play order of the playlist, and if the random number is within a second side of the predetermined range in comparison to the shuffle metric, producing a swap condition that indicates content items identified in the adjacent pair of content items are not to be swapped in position within the play order of the playlist.

* * * * *